(12) United States Patent
Tanaka

(10) Patent No.: US 11,829,669 B2
(45) Date of Patent: Nov. 28, 2023

(54) INSPECTION APPARATUS, CONTROL METHOD THEREOF, INSPECTION SYSTEM, AND STORAGE MEDIUM

(71) Applicant: CANON KABUSHIKI KAISHA, Tokyo (JP)

(72) Inventor: Hirotomo Tanaka, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/964,226

(22) Filed: Oct. 12, 2022

(65) Prior Publication Data

US 2023/0122294 A1    Apr. 20, 2023

(30) Foreign Application Priority Data

Oct. 18, 2021  (JP) .................................. 2021-170469

(51) Int. Cl.
  *G06F 3/12*  (2006.01)

(52) U.S. Cl.
  CPC ............ *G06F 3/1259* (2013.01); *G06F 3/121* (2013.01); *G06F 3/1208* (2013.01); *G06F 3/1284* (2013.01); *G06F 3/1204* (2013.01)

(58) Field of Classification Search
  CPC ...... G06F 3/1259; G06F 3/1208; G06F 3/121; G06F 3/1284
  USPC ................................................... 358/1.15, 5
  See application file for complete search history.

(56) References Cited

U.S. PATENT DOCUMENTS

| 11,455,129 B2 | 9/2022 | Yasaki |
| 2012/0047225 A1* | 2/2012 | Kunitake ............... G06Q 10/06 709/217 |
| 2020/0356318 A1 | 11/2020 | Wei et al. |
| 2021/0397386 A1* | 12/2021 | Hayashi ............... G06F 3/1275 |

FOREIGN PATENT DOCUMENTS

| JP | 2020184687 A | 11/2020 |
| JP | 2021037736 A | 3/2021 |

* cited by examiner

*Primary Examiner* — Darryl V Dottin
(74) *Attorney, Agent, or Firm* — ROSSI, KIMMS & McDOWELL LLP

(57) ABSTRACT

An inspection apparatus registers, as a reference image, image data generated based on a print job or image data obtained by scanning a printed sheet. The inspection apparatus sets a determination criterion value used in an inspection of a printed material to determine quality of the printed material and determines, in an inspection method for inspecting the printed material using the registered reference image which is based on image data generated based on a print job, quality of the printed material based on a difference between scanned image data that is obtained by scanning the print material and the registered reference image and on the determination criterion value. The inspection apparatus controls updating of the registered reference image based on a result of the determination.

12 Claims, 10 Drawing Sheets

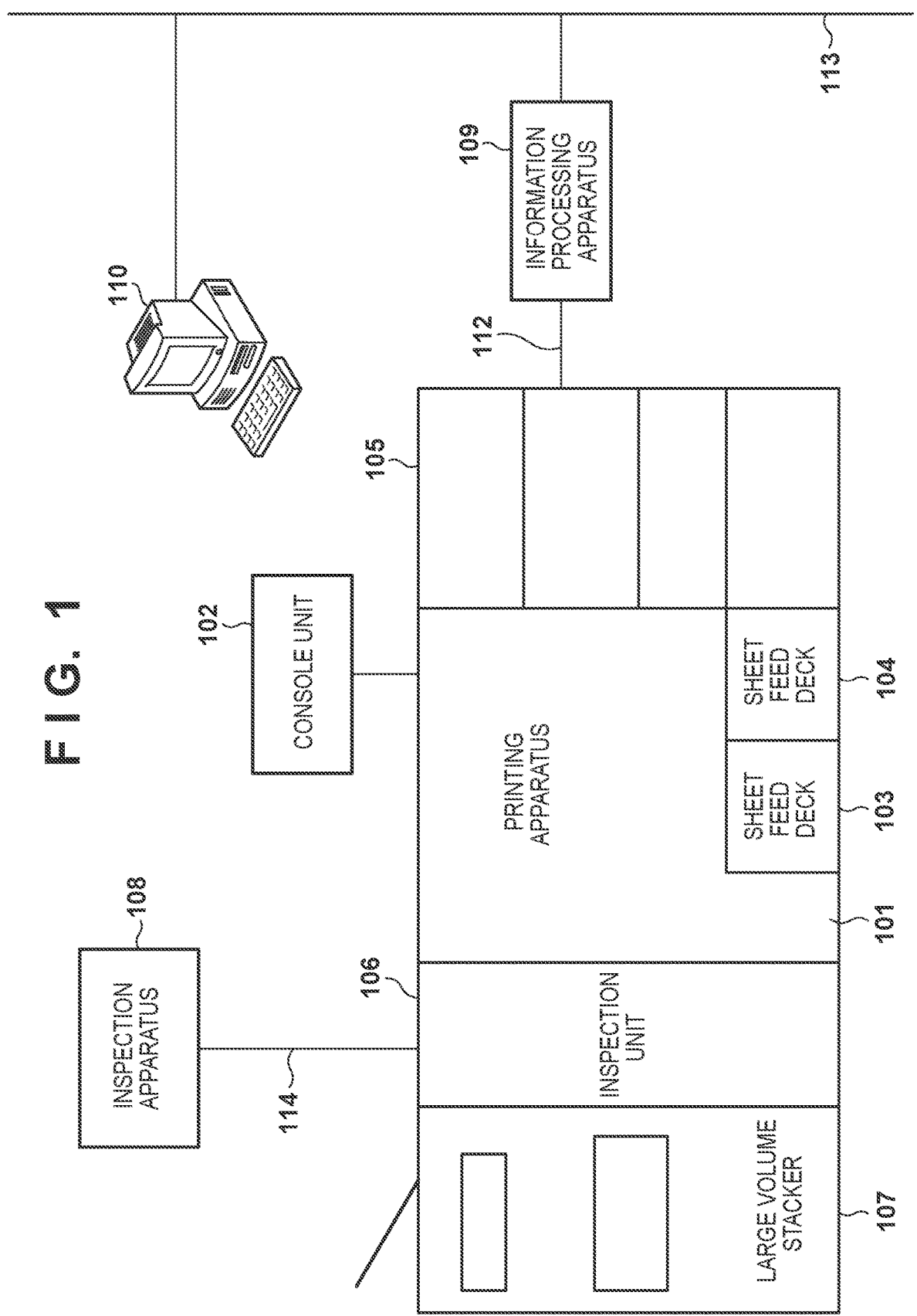

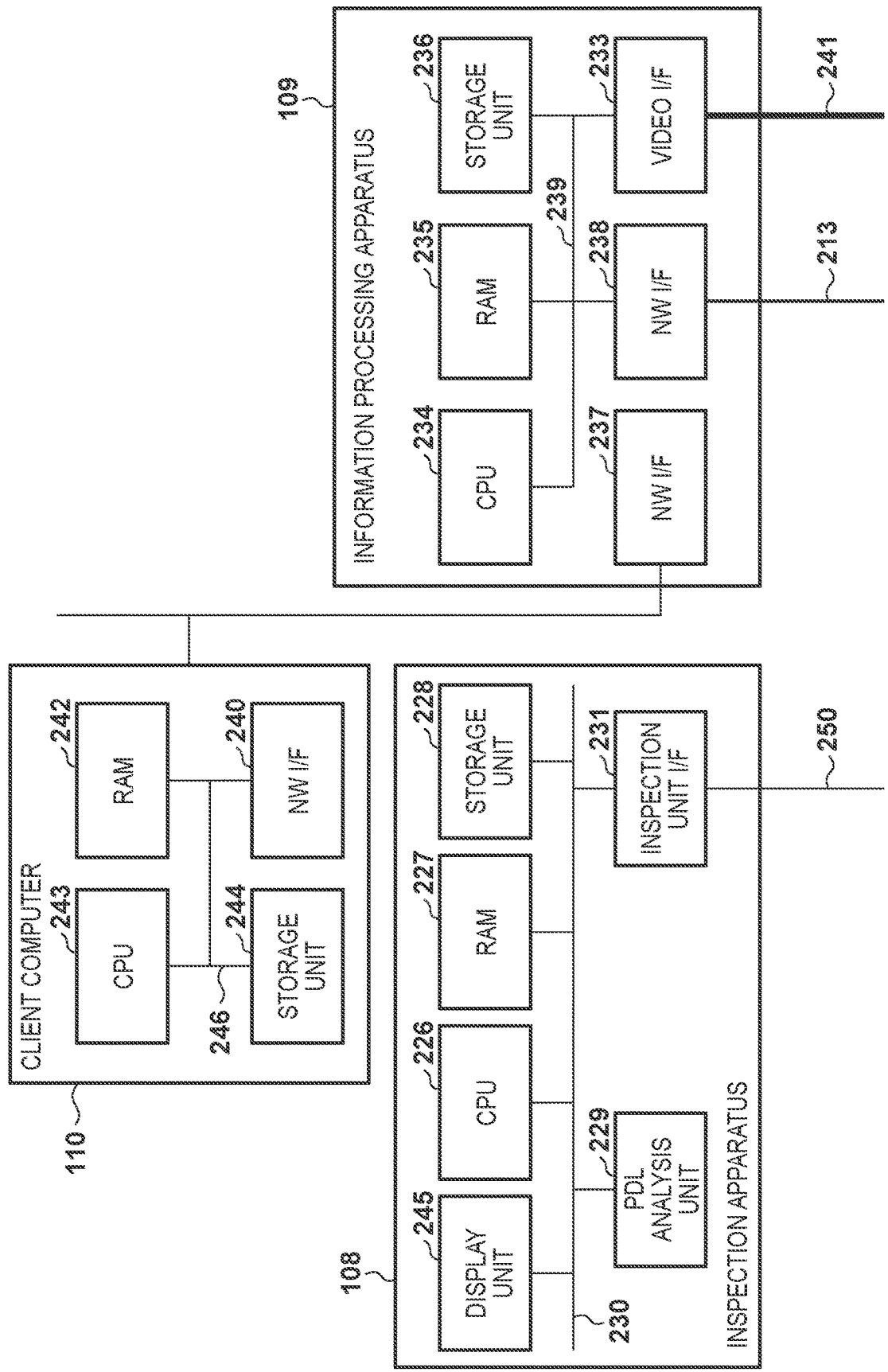

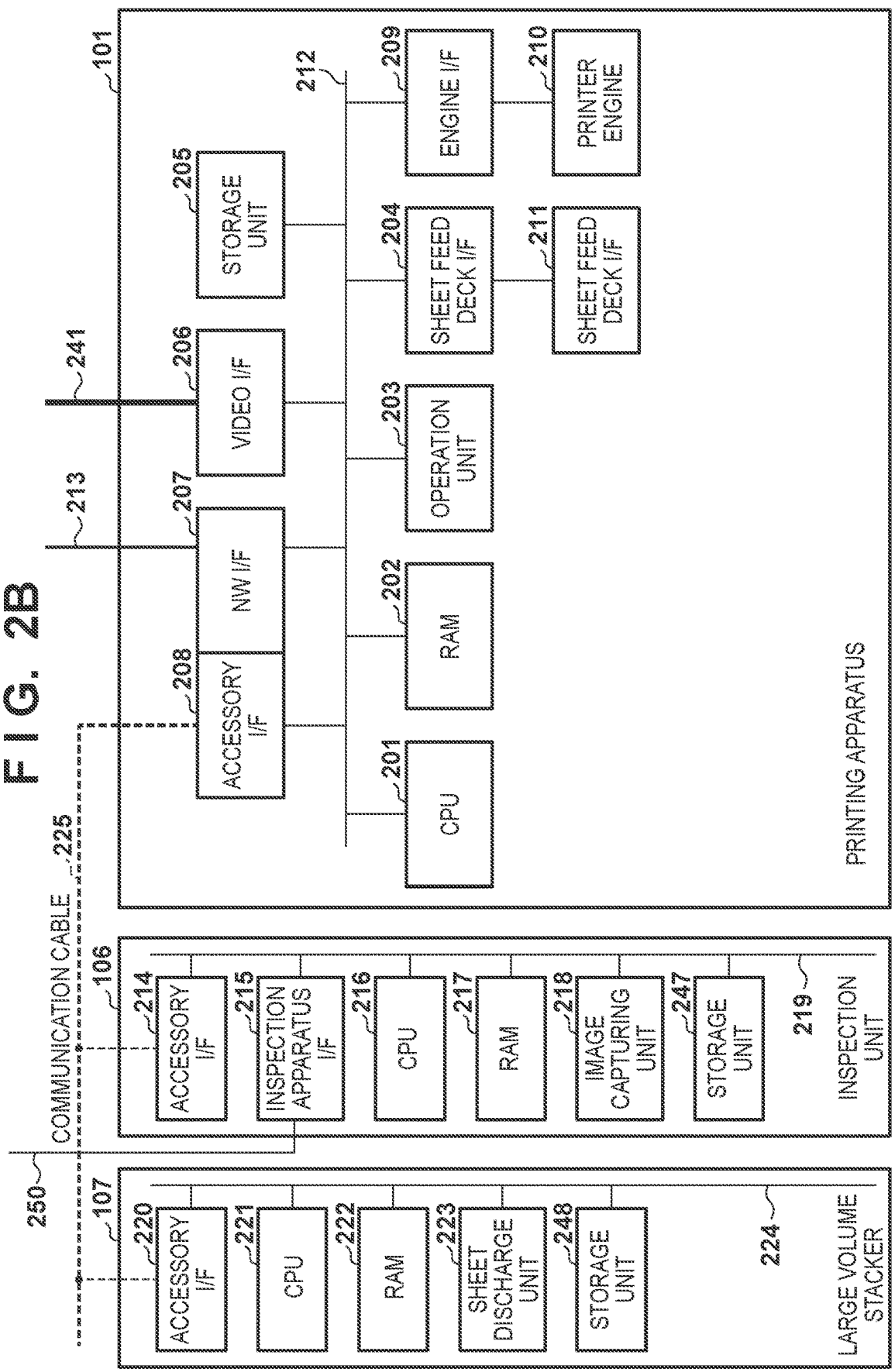

FIG. 4A

Configuration — 401

IMAGE STORAGE DESTINATION:
¥¥filepath¥group¥category¥title¥name¥date

OPERATION MODE SETTING:
- ○ LOG MODE
- ● PURGE MODE — 402

INSPECTION METHOD SETTING:
- ○ SCAN INSPECTION
- ● RIP INSPECTION — 404

FIG. 4B

Configuration Service mode

RECOVERY MODE SETTING: — 403
- ○ NO-RECOVERY MODE
- ● RECOVERY MODE

[ OK ] — 410   [ CANCEL ] — 411

FIG. 4C

Configuration: INSPECTION CRITERION — 405

INSPECTION CRITERION
(DIFFERENCE BETWEEN PRINTED MATERIAL AND REFERENCE IMAGE):

[0.3] mm — 406 STRICTER DETERMINATION CRITERION (FIRST DETERMINATION CRITERION VALUE)

[0.5] mm — 407 LOOSER DETERMINATION CRITERION (SECOND DETERMINATION CRITERION VALUE)

WHEN DIFFERENCE (DEVIATION) BETWEEN PRINT RESULT (TEST PRINT) AND REFERENCE IMAGE IS LARGER THAN FIRST DETERMINATION CRITERION VALUE AND EQUAL TO OR SMALLER THAN SECOND DETERMINATION CRITERION VALUE, CHECK PRINT RESULT (TEST PRINT) AND REFERENCE IMAGE ☑ — 408

RECORD RESULT IN LOG. ☑ — 409

FIG. 5

INSPECTION SITUATION (501)

INSPECTION_yyy/mm/dd.pdf

DURING INSPECTION (503)

STOP INSPECTION (502)

| INSPECTED: | NG: | FRACTION DEFECTIVE: |
|---|---|---|
| 100 | 2 | 2% |

| POSITION MISALIGNMENT: | CIRCULAR ANOMALY: | STREAKY ANOMALY: | ERROR: |
|---|---|---|---|
| 0 | 1 | 0 | 1 |

504

| SHEET No | FRONT/BACK | POSITION MISALIGNMENT | CIRCULAR ANOMALY | STREAKY ANOMALY | ERROR | INSPECTION DATE | DISPLAY DETAILS |
|---|---|---|---|---|---|---|---|
| 22 | FRONT SIDE | OK | OK | OK | NG | 2020/8/20 18:22:55 | DETAIL |
| 50 | BACK SIDE | OK | NG | OK | – | 2020/8/20 18:24:49 | DETAIL |
| | | | | | | | |
| | | | | | | | |
| | | | | | | | |

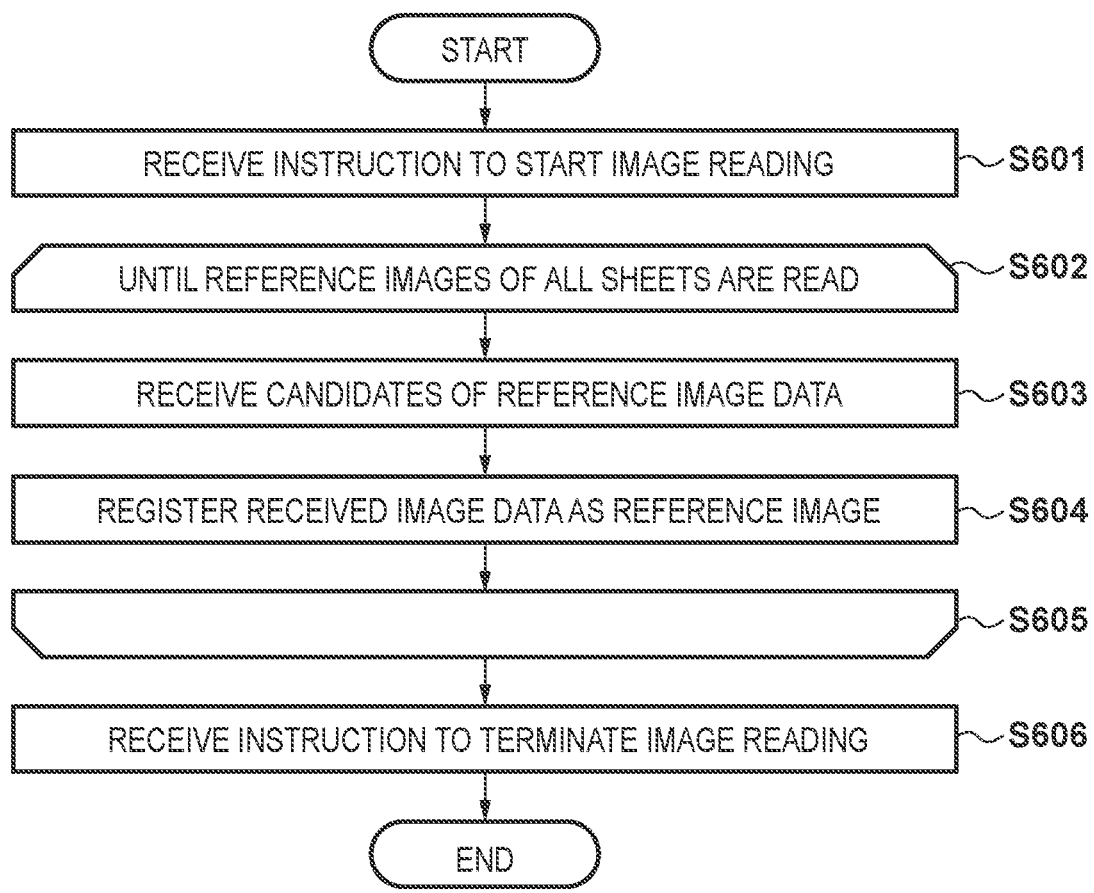

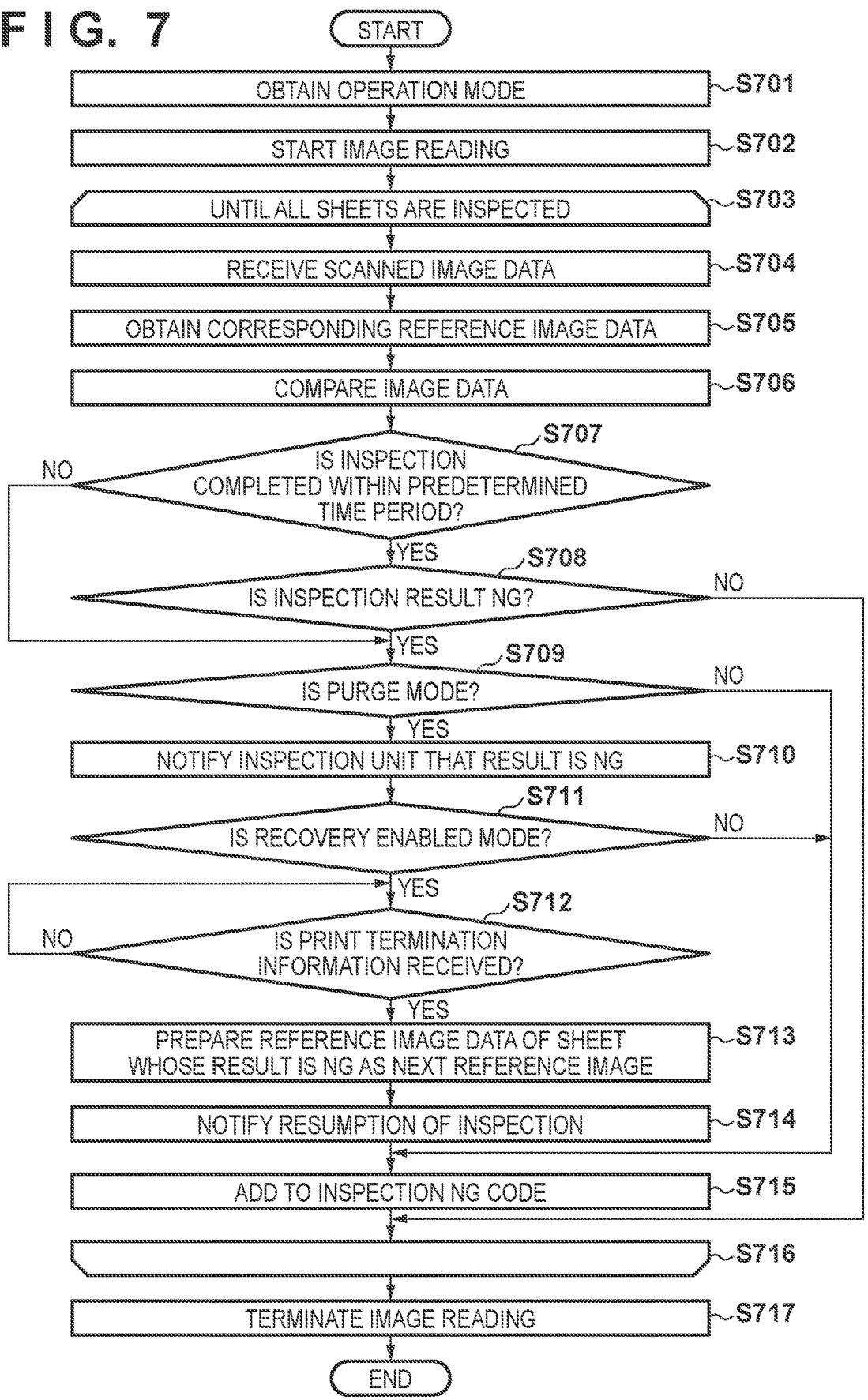

FIG. 9
WARNING　　　　　　　　　　　　　　　　　901
DIFFERENCE BETWEEN REFERENCE IMAGE AND PRINT RESULT IS DETECTED.
CHECK INSIDE OF DOTTED LINE RECTANGLE TO PRESS OK BUTTON IF YOU DETERMINE THAT PRINT RESULT IS PASSED.
LATEST PRINT RESULT WILL BE REFERENCE IMAGE AT HEREAFTER PRINTING OF SAME PAGE.
PRESS NG BUTTON IF YOU DETERMINE THAT IT IS FAILED.
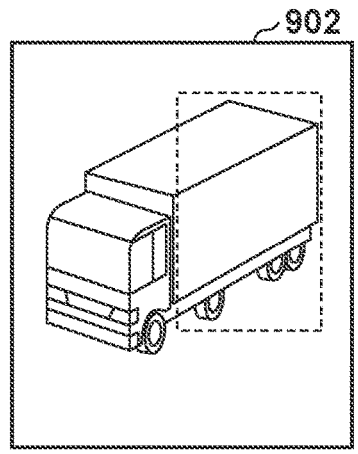
REFERENCE IMAGE
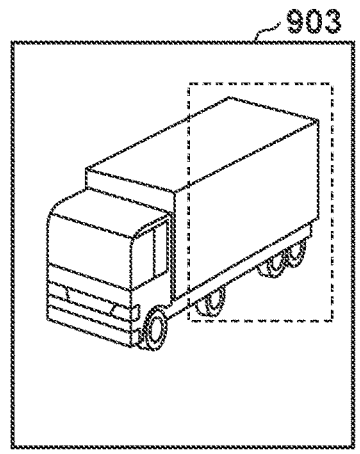
PRINT RESULT
904　OK　　905　NG

INSPECTION APPARATUS, CONTROL METHOD THEREOF, INSPECTION SYSTEM, AND STORAGE MEDIUM

BACKGROUND OF THE INVENTION

Field of the Invention

The invention relates to an inspection apparatus, a control method thereof, an inspection system, and a storage medium.

Description of the Related Art

There are known inspection apparatuses that read a printed material printed by a printing apparatus, and inspect the print quality of the printed material. The inspection apparatuses can detect image anomaly such as smearing or a missing print dot, printed characters error, barcode print quality, or the like. Some of such inspection apparatuses can detect the type of anomaly, and set a threshold value for each detected type for determining as an anomaly when detecting those image fault or anomaly in print quality of printing. In case of an abnormal dot which is an image anomaly having a circular shape, for example, it is possible to set a threshold such that the abnormal dot having a diameter of a certain width or more is determined to be an image anomaly. In addition, some inspection apparatuses allow for setting a threshold for a case of a streaky image anomaly, such that a streak having a length of a certain width or more is determined to be an image anomaly.

Such inspection employs a method of preliminarily registering anomaly-free image data referred to as reference image (correct image) to be a comparison target, and performing inspection by comparing an image of the printed material with the reference image. There are two types of reference image examples, one being a method that employs, as the reference image, scanned image data obtained by reading a printed material that is preliminarily printed, and the other being a method that employs, as the reference image, image data prior to printing such as image data created by raster image processing (RIP). Here, an inspection method using scanned image data as the reference image will be referred to as scan inspection, and an inspection method using RIP image data as the reference image will be referred to as RIP inspection.

In scan inspection, based on a print job to be inspected, one or more numbers of copies are preliminarily printed to obtain the scanned image data. Then a user, having checked that there is no smearing or printed characters error on printed sheets as many as the number of copies, employs the scanned image data as the reference image. The scan inspection is a method in which the user initially prints and visually checks the first 5 copies from, for example, a print job intended to prints 1000 copies, selects scanned image data thereof as the reference image, and uses the reference image as the comparison target when subsequently printing the remaining 995 copies. In this method, the scanned image data of the image visually checked by the user is used as the reference image, and therefore ensures that the reference image satisfies the print quality of printing required by the user. However, the method has a disadvantage in that visual check is time-consuming.

The RIP inspection, in contrast, employs a yet-to-be printed RIP image data as the reference image and uses it as the comparison target when printing an inspection target job. The RIP image data to be used may be RIP image data generated before printing by the printing apparatus, or RIP image data generated by an RIP apparatus other than the printing apparatus, such as for example, an RIP software. RIP image data is smear-free when printed. RIP inspection is characterized in that it allows for inspecting such anomaly without having to visually check the reference image by the user, which has a high productivity.

However, there may occur a difference between the RIP image data and the printed material, originating not from anomaly but from characteristics of the printing apparatus. When printing an extremely thin line referred to as a fine line, for example, a line of thickness of 0.5 pt on the printed material may be printed as a line of a thickness of 1 pt, depending on the performance of the printing apparatus. In such a case, a difference between images is detected in RIP inspection comparing the RIP image data and the scanned image data of the printed material. When the difference is determined to be an anomaly in such a case, the anomaly is a phenomenon originating from the performance of the printing apparatus and therefore it is impossible to eliminate the difference. Therefore, it is often inappropriate to determine the difference to be an anomaly. In yet another example, also a ripple-like fringe pattern referred to as moire that may appear in a printed material exists only in the printed material and not in the RIP image data. This also often depends on the performance of the printing apparatus, and usually should not be determined as an anomaly.

As such, Japanese Patent Laid-Open No. 2021-37736 describes a technique of excluding reference image which is inappropriate for the reference image. The technique described in Japanese Patent Laid-Open No. 2021-37736 uses scan inspection as the inspection method and, taking as an example a case where paper dust has adhered to the reading sensor of the inspection apparatus, excludes a candidate reference image read by the inspection apparatus from candidates of the reference image when the candidate reference image exhibits an anomaly that is highly likely to be affected by the paper dust.

In addition, Japanese Patent Laid-Open No. 2020-184687 describes changing the determination criterion for determining the anomaly in a primary inspection in accordance with the result of the secondary inspection by visual check by the user, when an anomaly originating from a printing apparatus is detected between the scanned image data of the printed material and the RIP image data in the primary inspection performed after print output. Accordingly, there is described a technique that allows for setting, to a print job executed by the printing apparatus, an appropriate determination criterion for the printing apparatus.

However, in RIP inspection, conventional techniques cannot exclude a reference image that is inappropriate for the printing apparatus used for printing. In addition, even when conventional techniques successfully exclude an inappropriate reference image in RIP inspection, they do not consider replacing it with an appropriate reference image.

SUMMARY OF THE INVENTION

An aspect of the present invention is to eliminate the above-mentioned problem with conventional technology.

A feature of the present invention is to provide a technique of extracting a reference image which is inappropriate for RIP inspection, and updating the reference image to a reference image which is appropriate for inspection.

According to a first aspect of the present invention, there is provided an inspection apparatus comprising: one or more memories storing instructions; and one or more processors that execute the instructions being configured to: register, as a reference image, image data generated based on a print job or image data obtained by scanning a printed sheet; set a determination criterion value used in an inspection of a printed material to determine quality of the printed material; determine, in an inspection method for inspecting the printed material using the registered reference image which is based on image data generated based on a print job, quality of the printed material based on a difference between scanned image data that is obtained by scanning the print material and the registered reference image and on the determination criterion value; and control updating of the registered reference image, based on a result of the determination.

According to a second aspect of the present invention, there is provided an inspection system comprising an inspection apparatus and a printing apparatus, the inspection apparatus comprising: one or more first memories storing instructions; and one or more first processors that execute the instructions being configured to: register, as a reference image, image data generated based on a print job or image data obtained by scanning a printed sheet; set a determination criterion value used in an inspection of a printed material to determine quality of the printed material; determine, in an inspection method for inspecting a printed material using the registered reference image which is based on image data generated based on the print job, quality of the printed material based on a difference between scanned image data that is obtained by scanning the print material and the registered reference image and on the determination criterion value; and control updating of the registered reference image, based on a result of the determination, and the printing apparatus comprising: one or more second memories storing instructions; and one or more second processors that execute the instructions being configured to: generate image data from a received print job and register the generated image data in the inspection apparatus as the reference image; and convey the printed material printed according to the print job to the inspection apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is an explanatory diagram of a configuration of an inspection system according to an embodiment of the invention;

FIG. 2A is a block diagram for describing a hardware configuration of an inspection apparatus, an information processing apparatus, and a client computer according to the embodiment;

FIG. 2B is a block diagram for describing a hardware configuration of a printing apparatus, an inspection unit, and a large volume stacker according to the embodiment;

FIGS. 4A to 4C depict views illustrating examples of a setting screen displayed on a display unit of the inspection apparatus according to the embodiment;

FIG. 5 depicts a view illustrating an example of an inspection situation screen presenting an inspection situation displayed on the display unit when inspection is executed by the inspection apparatus according to the embodiment;

FIG. 6 is a flowchart for describing a process of registering reference image data by the inspection apparatus according to the embodiment;

FIG. 7 is a flowchart for describing an inspection process executed by the inspection apparatus according to the embodiment;

FIG. 9 depicts a view illustrating an example of a reference image selection screen displayed on the display unit of the inspection apparatus according to the embodiment.

DESCRIPTION OF THE EMBODIMENTS

Figure 3:
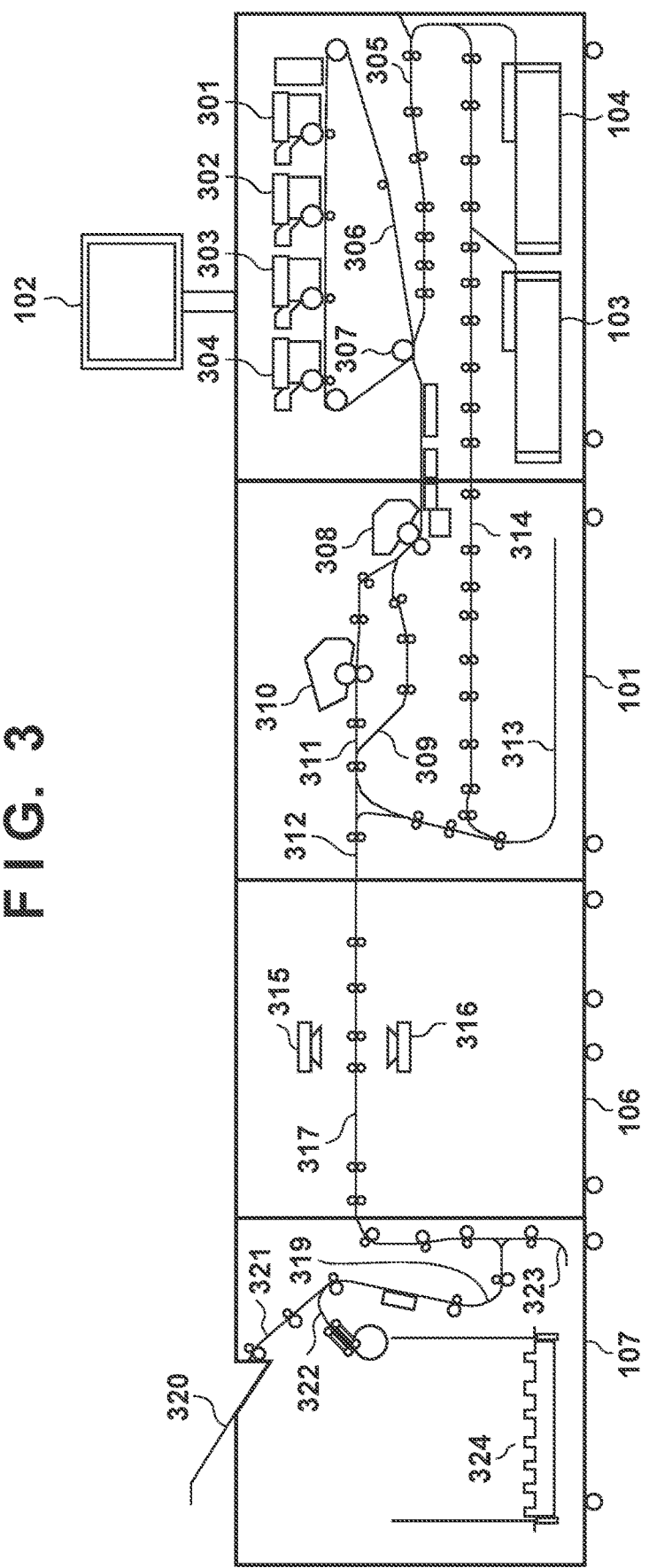
FIG. 3 is an explanatory diagram illustrating an internal configuration of the printing apparatus, the inspection unit, and the large volume stacker according to the embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

It goes without saying that, unless otherwise stated, the invention can be applied to a stand-alone device or an inspection apparatus including a plurality of devices provided that it realizes functions according to the invention. Unless otherwise specified, it goes without saying that the present invention can be applied to even an inspection apparatus that is connected via a network such as a local area network (LAN) or a wide area network (WAN) and performs processing as long as the functions of the present invention are archived. That is, it goes without saying that the system configuration to which various terminals described in the following embodiments are connected is an example, and there are various configuration examples depending on the application and purpose.

FIG. 1 is an explanatory diagram of a configuration of an inspection system according to an embodiment of the invention. Although the printing apparatus according to the embodiment will be described taking an electrophotographic printing apparatus as an example, the printing apparatus according to the embodiment may also employ a printing apparatus of a different image forming scheme such as inkjet or offset printing.

A printing apparatus 101 is connected to an information processing apparatus 109 via a cable 112. The information processing apparatus 109 is connected to a client computer 110 via a network 113. The printing apparatus 101 includes a console unit 102, a sheet feed deck 103, and a sheet feed deck 104. Furthermore, an optional deck 105 including three stages of sheet feed decks is connected. The printing apparatus 101 is an electrophotographic printing apparatus, for example. In addition, the console unit 102, including, for example, a capacitive touch panel, various hardware keys, or the like provides a user interface. Furthermore, the printing apparatus 101 includes an inspection unit 106 and a large volume stacker 107. The inspection unit 106 is connected to an inspection apparatus 108 via a cable 114. The large volume stacker 107 includes a main tray and a top tray, the main tray can have several thousand sheets stacked thereon simultaneously.

A print job is generated by the client computer 110, transmitted to the information processing apparatus 109 via the network 113, and managed by the information processing apparatus 109. The print job is then transmitted from the information processing apparatus 109 to the printing apparatus 101 via the cable 112, and the printing apparatus 101 prints an image on a sheet according to the print job. Here, the print job may be generated and managed by the information processing apparatus 109, transmitted to the printing apparatus 101 via the network 112, and managed by the printing apparatus 101.

In addition, the client computer 110, the information processing apparatus 109, and the inspection apparatus 108 may be connected to the cable 112, thereby allowing communication with the printing apparatus 101 via the cable 112. The inspection apparatus 108 may also be connected to the information processing apparatus 109 and the client computer 110 via the network 113. In other words, it goes without saying that the connection form of the printing apparatus 101, the information processing apparatus 109, and the client computer 110 according to the embodiment is merely an example, and there are various connection forms other than those illustrated in the present embodiment. The printing apparatus 101 may have connected thereto a finisher, a folding apparatus, a bookbinding apparatus, or the like that allows stapling, in addition to the inspection unit 106 and the large volume stacker 107.

FIG. 2A is a block diagram for describing a hardware configuration of the inspection apparatus 108, the information processing apparatus 109, and the client computer 110 according to the embodiment.

In addition, FIG. 2B is a block diagram for describing a hardware configuration of the printing apparatus 101, the inspection unit 106, and the large volume stacker 107 according to the embodiment.

First, the printing apparatus 101 will be described, referring to FIG. 2B.

A Central Processing Unit (CPU) 201 conducts control and operations of respective units in the printing apparatus 101 via a system bus 212. The CPU 201 conducts execution of programs stored in a storage unit 205 and deployed in a Random Access Memory (RAM) 202. The RAM 202, which is a general type of volatile storage device directly accessible from the CPU 201, is used as a work area of the CPU 201 and miscellaneous temporary data storage area. The storage unit 205 functions as a temporary storage area and a work memory during operation of the printing apparatus 101.

An engine interface (I/F) 209 conducts communication with and control of a printer engine 210. A sheet feed deck I/F 204 manages communication with and control of a sheet feed deck 211. Here, the sheet feed deck 211 is a collective name of a hardware configuration including the sheet feed decks 103 and 104, and the optional deck 105 illustrated in FIG. 1. An operation unit 203, which is a hardware configuration of the console unit 102 in FIG. 1, provides a user interface configured to operate the printing apparatus 101 in general.

A network interface (NWI/F, in the following) 207 is connected to an NWI/F 238 (FIG. 2A) of the information processing apparatus 109 via a cable 213, and conducts communication between the information processing apparatus 109 and the printing apparatus 101. Although the interfaces connected to the system buses 212 and 239 of the printing apparatus 101 and the information processing apparatus 109 are directly connected to each other in this example, the information processing apparatus 109 and the printing apparatus 101 may be connected via a network, for example, the connection not being limited to any form. A video I/F 206, which is connected to a video I/F 233 (FIG. 2A) of the information processing apparatus 109 via a video cable 241, conducts communication of image data between the information processing apparatus 109 and the printing apparatus 101.

Note that the connection interface with the printing apparatus 101 in the information processing apparatus 109 may integrate the functions of the NWI/F 238 and the video I/F 233. The connection interface with the information processing apparatus 109 in the printing apparatus 101 may integrate the functions of the NWI/F 207 and the video I/F 206.

An accessory I/F 208 is connected to an accessory I/F 214 of the inspection unit 106 and an accessory I/F 220 of the large volume stacker 107, via a cable 225. In other words, the printing apparatus 101 mutually communicates with the inspection unit 106 and the large volume stacker 107 via the accessory I/Fs 208, 214 and 220.

Next, a configuration of the inspection unit 106 will be described.

A CPU 216 executes a program stored in a storage unit 247 and deployed in a RAM 217 to conduct the control and operations of respective units in the inspection unit 106 via a system bus 219. The RAM 217, which is a general type of volatile storage device directly accessible from the CPU 216, is used as a work area of the CPU 216 and miscellaneous temporary data storage area. The storage unit 247 functions as a temporary storage area and a work memory during operation of the inspection unit 106. An inspection apparatus I/F 215 is connected to an inspection unit I/F 231 (FIG. 2A) of the inspection apparatus 108 via a cable 250. That is, the inspection unit 106 communicates with the inspection apparatus 108 via the inspection apparatus I/F 215 and the inspection unit I/F 231.

An image capturing unit 218, including an image capturing function having mounted thereon a contact image sensor (CIS), for example, captures an image of a sheet passing through the inspection unit 106, and transmits the captured image data to the inspection apparatus 108 via the inspection apparatus I/F 215. Here, the CIS of the image capturing unit 218 is an example of a sensor, and other types of sensors such as a CCD image sensor may be used, without limiting the image capturing method. There are two purposes of transmitting the captured image data. One is for capturing an image of the printed material of the print job to be inspected and transmitting it to the inspection apparatus 108 for inspection, regardless of the inspection method. The other is for printing and capturing an image of one or a plurality of copies in a print job in order to generate a reference image prior to the print job to be inspected, and transmitting it to the inspection apparatus 108 as a reference image, when the inspection method is scan inspection. In the case of scan inspection, the inspection apparatus 108 stores the transmitted scanned image data as a reference image in the storage unit 228.

Next, a configuration of the large volume stacker 107 will be described.

A CPU 221 executes a program stored in a storage unit 248 and deployed in a RAM 222 to conduct the control and operations of respective units in the large volume stacker 107 via a system bus 224. The RAM 222, which is a general type of volatile storage device directly accessible from the CPU 221, is used as a work area of the CPU 221 and miscellaneous temporary data storage area. The storage unit 248 functions as a temporary storage area and a work memory during operation of the large volume stacker 107. A sheet discharge unit 223 manages a sheet discharge operation to the main tray and the top tray, and monitoring and control of a stack state of each of the main tray and the top tray.

Next, a configuration of the inspection apparatus 108 will be described, referring to FIG. 2A.

A CPU 226 executes a program stored in a storage unit 228 and deployed in a RAM 227 to conduct the control and operations of respective units in the inspection apparatus 108 via a system bus 230. The RAM 227, which is a general type of volatile storage device directly accessible from the CPU 226, is used as a work area of the CPU 226 and miscellaneous temporary data storage area. The storage unit 228 functions as a temporary storage area and a work memory during operation of the inspection apparatus 108. A PDL analysis unit 229 reads PDL data such as, for example, PDF, PostScript, or PCL received from the client computer 110 or the information processing apparatus 109, and executes an interpretation process thereof. A display unit 245, which is a display connected to the inspection apparatus 108, for example, accepts a user's input to the inspection apparatus 108 and displays the status of the inspection apparatus 108.

Next, a configuration of the information processing apparatus 109 will be described.

A CPU 234 executes a program stored in a storage unit 236 and deployed in a RAM 235 to conduct the control and operations of respective units in the information processing apparatus 109 via a system bus 239. The RAM 235, which is a general type of volatile storage device directly accessible from the CPU 234, is used as a work area of the CPU 234 and miscellaneous temporary data storage area. The storage unit 236 functions as a temporary storage area and a work memory during operation of the information processing apparatus 109. A network interface (NWI/F) 237 is connected to an NWI/F 240 of the client computer 110 via a network and communicates with the client computer 110.

Alternatively, the inspection apparatus 108 may include an NWI/F, and the information processing apparatus 109 may communicate with the inspection apparatus 108 via the NWI/F and the NWI/F 237. For example, let us consider a case of using RIP inspection as the inspection method, and using RIP image data, used by the printing apparatus 101 for printing, as the reference image. In such a case, the printing apparatus 101 may transmit the reference image to the inspection apparatus 108 via the inspection apparatus I/F 215 of the inspection unit 106. Alternatively, the printing apparatus 101 may transmit the reference image to the inspection apparatus 108 via the NWI/F 207 of the printing apparatus 101, the NWI/F 237 of the information processing apparatus 109, and the NWI/F provided in the inspection apparatus 108.

Next, a configuration of the client computer 110 will be described.

A CPU 243 executes a program stored in a storage unit 244 and deployed in a RAM 242 to conduct the control and operations of respective units in the client computer 110 via a system bus 246. The RAM 242, which is a general type of volatile storage device directly accessible from the CPU 243, is used as a work area of the CPU 243 and miscellaneous temporary data storage area. The storage unit 244 functions as a temporary storage area and a work memory during operation of the client computer 110.

FIG. 3 is an explanatory diagram of an internal configuration of the printing apparatus 101, the inspection unit 106, and the large volume stacker 107 according to the embodiment.

The printing apparatus 101 accepts a user's input via the console unit 102, or displays the status of printing or devices. The sheet feed decks 103 and 104 can store various sheets. Each sheet feed deck can separate only the uppermost one of the stored sheets and convey it to a sheet conveyance path 305. In order to form a color image, developing stations 301 to 304 respectively use Y, M, C and K color toners to form a toner image. The toner image formed here is primarily transferred to an intermediate transfer belt 306. The intermediate transfer belt 306 rotates clockwise in FIG. 3, whereby the toner image is transferred at a secondary transfer position 307 to the sheet conveyed from the sheet conveyance path 305. A fixing unit 308 includes a pressure roller and a heating roller, and when the sheet passes through between the rollers, the fixing unit 308 melts and presses the toner to fix the toner image on the sheet. The sheet having passed through the fixing unit 308 is conveyed to a conveyance path 312 through a sheet conveyance path 309. When further melting-and-press-bonding is required for fixing depending on the type of sheet, the sheet having passed through the fixing unit 308 is subsequently conveyed to a second fixing unit 310 using the aforementioned sheet conveyance path, subjected to additional melting and press bonding, and subsequently conveyed to the conveyance path 312 through a sheet conveyance path 311. When the image forming mode is double-sided, the post-fixation sheet is conveyed to a sheet reversing path 313, reversed in the sheet conveyance path 313 and subsequently conveyed to a double-sided conveyance path 314, and an image is transferred on the second side at the secondary transfer position 307.

In the inspection unit 106, CISs 315 and 316 are provided in a manner facing each other. The CIS 315 is a sensor configured to read the upper surface of the sheet, and the CIS 316 is a sensor configured to read the lower surface of the sheet. The inspection unit 106 scans the sheet using the CISs 315 and 316 at a timing when the sheet conveyed to the sheet conveyance path 317 reaches a predetermined position. The scanned image data obtained by scanning is transmitted to the inspection apparatus 108 via the inspection apparatus I/F 215 and the inspection unit I/F 231. The CPU 226 of the inspection apparatus 108 determines whether or not there is an anomaly in the received image data, and notifies the inspection unit 106 of the determination result again via the inspection unit I/F 231 and the inspection apparatus I/F 215. The CPU 216 of the inspection unit 106 notifies the large volume stacker 107 of the received determination result via the accessory I/Fs 214 and 220.

The large volume stacker 107 includes a main tray 324 as a tray on which sheets are stacked. The sheet having passed through the inspection unit 106 enters the large volume stacker 107 through a sheet conveyance path 319. Sheets are stacked on the main tray 324 from the sheet conveyance path 319 via a sheet conveyance path 322. The large volume stacker 107 further includes a top tray 320 as a sheet discharge tray. The CPU 221 of the large volume stacker 107 discharges, to the top tray 320, the sheet on which the anomaly has been detected by the inspection apparatus 108. In a case of discharging the sheet to the top tray 320, the sheet is conveyed from the sheet conveyance path 319 to the top tray 320 via a sheet conveyance path 321. A reversing unit 323 is configured to reverse sheets, and used when stacking sheets on the main tray 324. The reversing unit 323 reverses the sheets once when the sheets are stacked on the main tray 324 such that the orientation of the incoming sheets and the orientation of the sheets at the time of stacking are the same. In the case of conveyance to the top tray 320, since the sheet is discharged as it is without being flipped at the time of stacking, the reversing unit 323 does not perform the reversing operation.

FIG. 4A depicts a view illustrating an example of an operation mode setting screen 401 displayed on the display unit 245 of the inspection apparatus 108 according to the embodiment.

The operation mode setting screen 401 accepts an operation mode setting from the user. When "log mode" is selected in an operation mode setting section 402, the printing apparatus 101 discharges the post-inspection sheet to a discharge destination preliminarily specified in the print job property, regardless of the result of inspection performed by the inspection apparatus 108. When "purge mode" is selected in the operation mode setting section 402, the printing apparatus 101 controls to discharge the sheet, whose inspection result is NG, to the top tray 320 of the large volume stacker 107. In addition, when "scan inspection" is selected in an inspection method setting section 404, the inspection apparatus 108 employs the scanned image data of the printed material as the reference image to be used for inspection. When, on the other hand, "RIP inspection" is selected, the inspection apparatus 108 employs, as the reference image, the RIP image data to be used for printing by the printing apparatus 101. Generation and storage process of the reference image will be described below, referring to the flowchart illustrated in FIG. 6.

FIG. 4B depicts a view illustrating an exemplary setting screen for recovery setting of a purge mode displayed on the display unit 245 of the inspection apparatus 108 according to the embodiment.

When "purge mode" is selected on the operation mode setting section 402 of the operation mode setting screen 401 illustrated in FIG. 4A, the setting of a recovery mode in a recovery mode setting section 403 on the setting screen of FIG. 4B is reflected therein. The recovery mode setting section 403 accepts a setting of the recovery mode from the user. When "no-recovery mode" is selected in the recovery mode setting section 403 and an OK button 410 is pressed, the printing apparatus 101 enters a mode that discharges only the sheet, whose inspection result is NG, to the top tray 320. The printing apparatus 101 and the inspection apparatus 108 then continue inspection of subsequent sheets as usual. If a cancel button 411 is pressed, the recovery mode is not set and the screen is made a transition to the operation mode setting screen 401.

When, on the other hand, "recovery mode" is selected in the recovery mode setting section 403 and the OK button 410 is pressed, the printing apparatus 101 enters a "recovery enabled mode" in the "purge mode". On this occasion, the printing apparatus 101 discharges, to the top tray 320, the sheet whose inspection result is NG, altogether with subsequent already-fed sheets remaining in the printing apparatus 101 and the inspection apparatus 108 at the time when the inspection apparatus 108 determined the inspection result being NG. Subsequently, when there is no sheet left in the sheet conveyance path, the printing apparatus 101 and the inspection apparatus 108 resume printing and inspection from the image data intended to be printed on the sheet whose inspection result is NG.

The inspection apparatus 108 according to the embodiment executes capturing and inspecting an image, on the printed sheet, by the CISs 315 and 316 of the inspection unit 106 while printing with the printing apparatus 101. Accordingly, when the inspection apparatus 108 determines that the inspection result of a certain sheet is NG, there is a possibility that subsequent sheets have already reached the sheet conveyance path 309 or the sheet conveyance path 311. Therefore, unless all the sheets in the sheet conveyance paths are discharged, printing may be performed again from the image data printed on the sheet whose inspection result is NG, thereby sheets are not discharged in a correct output order to the discharge destination preliminarily specified in the print job. Therefore, the "recovery mode" executes the aforementioned operation.

The CPU 226 of the inspection apparatus 108 notifies the inspection unit 106 of the operation mode, the recovery mode, and the inspection method which have been set in the operation mode setting section 402, the recovery mode setting section 403, and the inspection method setting section 404, via the inspection unit I/F 231 and the inspection unit I/F 215. Here, the operation mode, the recovery mode, and the inspection method which have been set in the operation mode setting section 402, the recovery mode setting section 403, and the inspection method setting section 404 are stored in the RAM 227 by the CPU 226 of the inspection apparatus 108 and in the RAM 217 by the CPU 216 of the inspection unit 106, respectively.

FIG. 4C depicts a view illustrating an example of an inspection criterion setting screen 405 for setting an inspection criterion to be displayed on the display unit 245 of the inspection apparatus 108 according to the embodiment.

The inspection criterion setting screen 405 accepts from the user a setting of the inspection criterion in the inspection apparatus 108. The inspection criterion, which is a criterion for determining that an inspection result is NG, indicates the difference between the scanned image data of the print result and the reference image in terms of distance. In the embodiment, the difference between the scanned image data of the print result and the reference image represents a difference between the RIP image data and the scanned image data, the difference originating from misalignment or characteristics of the printing apparatus 101 described below. The inspection apparatus 108 determines that the inspection result is OK when the difference between the scanned image data of the print result and the reference image is smaller than a second determination criterion value 407 which is a more relaxed determination criterion than a first determination criterion value 406 which is a stricter determination criterion. The second determination criterion value 407 is used in common for both scan inspection and RIP inspection. On the other hand, the first determination criterion value 406, which is a stricter setting than the second determination criterion value 407, becomes effective when setting in the inspection method setting section 404 is "RIP inspection". In FIG. 4C, the first determination criterion value 406 indicates that the inspection result is determined to be OK when the difference (distance) between the RIP image data and the scanned image data falls in a range from 0 to 0.3, or NG when it exceeds the range. In addition, the second determination criterion value 407 indicates that the inspection result is determined to be OK when the difference (distance) falls in a range from 0 to 0.5, or NG when it exceeds the range.

A check box 408 is used to instruct displaying of a screen (e.g., FIG. 9) on which the user can visually check the difference between the scanned image data and the reference image by displaying those images, when the difference between the scanned image data and the reference image satisfies the second determination criterion value 407 but does not satisfy the first determination criterion value 406, in other words, when the difference is larger than 0.3 and equal to or smaller than 0.5. Checking a check box 409 instructs the inspection result to be recorded in a log.

In the embodiment, there is proposed a technique for selecting desirable reference image in order to eliminate failure in the inspection result due to the difference between the RIP image data and the scanned image data of the printed material, the difference originating from the printing apparatus 101 generated in the course of RIP inspection. The aforementioned process will be described below, referring to the flowchart illustrated in FIG. 8.

When "RIP inspection" is set in the inspection method setting section 404, the inspection apparatus 108 determines whether or not the difference between the scanned image data of the print result and the reference image falls within either the second determination criterion value 407 or the first determination criterion value 406. When it is determined that the second determination criterion value 407 is satisfied but the first determination criterion value 406 is not satisfied, the inspection apparatus 108 presents the user with a reference image selection screen described below referring to FIG. 9, in order to accept a determination by the user.

Although the difference between the scanned image data of the print result and the reference image is indicated by a distance as an inspection criterion in the present embodiment, the invention is not limited thereto, and a different parameter such as color tone may be presented as the inspection criterion.

FIG. 5 depicts a view illustrating an example of an inspection situation screen 501 displaying the inspection situation to be displayed on the display unit 245 when executing inspection in the inspection apparatus 108 according to the embodiment.

The inspection situation screen 501 accepts execution or termination of inspection, or displays an inspection situation. A button 502 accepts from the user an execution of inspection or a termination of inspection. An inspection status 503 displays the inspection situation at the current time. When the button 502 is pressed and an inspection execution is started, the character string displayed on the button 502 changes to "stop inspection" and the inspection status 503 changes to "under inspection". Pressing the button 502 again in this state changes the character string displayed on the button 502 to "start inspection", and the inspection status 503 to "not in operation". In the following, the character string and the inspection status 503 displayed on the button 502 change in a toggle manner each time the button 502 is pressed. In the example illustrated in FIG. 5, display of the inspection status 503 is "under inspection" and display on the button 502 is "stop inspection".

The inspection situation screen 501 further displays, in real time during inspection, number of sheets subjected to inspection, number of sheets whose inspection result is NG, fraction defective, and number of occurrences of factors that may cause the inspection result to be NG. Here, what is displayed "error" in the inspection situation screen 501 is the number of times an inspection failed to be completed within a predetermined inspection time period and therefore the inspection apparatus 108 has determined that an inspection resulted in a time-out error, which is equivalent to the inspection result is NG. Each time an inspection results in NG, an inspection NG results list 504 has added to sheet number of the NG, information of front side or back side, cause of NG, inspection date and time, a link to a detailed screen (not illustrated) of NG. When "details" in the inspection NG results list 504 is pressed, the display unit 245 displays a screen that allows browsing of the captured image of an NG inspection result, the position of the anomaly, or the like.

As causes of NG inspection results, there are exemplified misalignment, circular anomaly (abnormal dot), and streaky anomaly (streak). When comparing the scanned image data and the reference image data, there are respectively defined an anomaly such that all or a part of the image is generally displaced as misalignment, a state in which smearing has occurred circularly only on the side of the scanned image data as circular anomaly, and a state in which the smearing has occurred in a streak-like or linear manner only on the side of the scanned image data as streaky anomaly. The inspection apparatus 108 thus identifies and displays on the inspection NG results list 504, the type of the detected anomaly from the characteristics of the anomaly. The foregoing examples are merely exemplary, and the types of anomaly detectable by the inspection apparatus 108 are not limited thereto. When, for example, an image is rendered only for the reference image, whereas all or part of the scanned image data are lacking an image, the situation may be determined as image missing and added to the inspection NG results list.

In the following, a process that characterizes the present embodiment will be described, referring to the flowchart.

The program of the printing apparatus according to the flowchart described below is stored in the storage unit 205 of the printing apparatus 101, deployed in the RAM 202 and executed by the CPU 201. In addition, the program of the inspection apparatus 108 according to the flowchart is stored in the storage unit 228 of the inspection apparatus 108, deployed in the RAM 227 and executed by the CPU 226.

FIG. 6 is a flowchart for describing a process performed when the inspection apparatus 108 according to the embodiment registers the reference image. The process described in the flowchart is realized by executing, by the CPU 226, the program deployed in the RAM 227. As has been described above, the reference image is the scanned image data obtained by scanning the printed material when the inspection method is scan inspection, and the reference image is the RIP image data used by the printing apparatus 101 for printing when the inspection method is RIP inspection. The flowchart illustrated in FIG. 6 is a flow in common for both scan inspection and RIP inspection.

In step S601, the CPU 226 accepts an instruction from a user to start image reading, via the button 502 of the inspection situation screen 501 displayed on the display unit 245. Next, the processing proceeds to step S602 and the CPU 226 repeats the processing from step S602 to step S604 until the reference image of all the sheets are stored. In step S603, the CPU 226 receives the scan data obtained by scanning by the CIS 315 and the CIS 316 in the inspection unit 106, via the inspection unit I/F 231 and the inspection apparatus I/F 215, when the inspection method is scan inspection. When, on the other hand, the inspection method is RIP inspection, the CPU 226 receives the RIP image data generated by the printing apparatus 101 before printing, via the inspection unit I/F 231 and the inspection apparatus I/F 215.

The processing then proceeds to step S604 and the CPU 226 stores the image data received in step S603 in the RAM 227 as the reference image. The inspection method on this occasion is a method set by the inspection method setting section 404 illustrated in FIG. 4A described above.

In the embodiment, there will be described a process for registering appropriate reference image using the RIP image data or the scanned image data based on the setting on the inspection criterion setting screen 405 of FIG. 4C, when the inspection method is RIP inspection. Details of the process will be described below, referring to the flowchart illustrated in FIG. 8.

The processing then proceeds to step S605 and the CPU 226 repeats steps S602 to S604 until reading of images from all the sheets is completed. Upon completion of reading of images from all the sheets, the processing proceeds to step S606 and the CPU 226 accepts, via the display unit 245, an instruction from the user to terminate image reading.

Note that the example presented here is merely illustrative, and the instruction from the user via the display unit 245 to start image reading at step S601, for example, may be automatically performed in conjunction with an instruction to start printing at the printing apparatus 101, the information processing apparatus 109, or the client computer 110. Accordingly, the manner thereof is not limited to any form. In addition, the instruction from the user via the display unit 245 to terminate image reading in step S606 may also be automatically performed in conjunction with termination of printing at the printing apparatus 101, and the manner thereof is not limited to any form.

In addition, when the inspection method is scan inspection, the inspection apparatus 108 may employ a mode in which, for example, a plurality of images are read from a same page and a synthesis image thereof is registered as the reference image.

FIG. 7 is a flowchart for describing an inspection process executed by the inspection apparatus 108 according to the embodiment. The process described in the flowchart is realized by executing, by the CPU 226, the program deployed in the RAM 227.

In step S701, the CPU 226 obtains the operation mode which has been set in the operation mode setting section 402 on the screen of FIG. 4A, and the recovery mode which has been set in the recovery mode setting section 403 on the screen of FIG. 4B. In addition, the CPU 226 obtains the setting of the inspection method which has been set by the inspection method setting section 404 illustrated in FIG. 4A. The processing then proceeds to step S702 and the CPU 226 accepts, via the display unit 245, an inspection from the user to start image reading. Next, the processing proceeds to step S703 and, when there exists a sheet to be inspected, proceeds to step S704. From step S703 to step S715, the processes are repeated until processing of the inspection target sheet is completed.

In step S704, the CPU 226 receives, from the inspection unit 106 via the inspection unit I/F 231 and the inspection apparatus I/F 215, scanned image data (scanned image, in the following) obtained by scanning a printed sheet to be inspected. The scanned image refers to image data obtained by scanning a printed material, which is a product printed by executing a print job. Next, the processing proceeds to step S705 and the CPU 226 reads, from the RAM 227, a reference image data (reference image, in the following) of a corresponding page which has been registered in step S604 illustrated in FIG. 6. The reference image is one that is generated based on the method set by the inspection method setting section 404. The processing then proceeds to step S706 and the CPU 226 compares the scanned image received in step S704 and the reference image (correct image) read in step S705 to inspect the image of the printed material.

The comparison process first aligns the positions of the reference image and the inspection target scanned image, using characteristic points of the images as reference points for position alignment. Additionally, for the inspection target scanned image, the process analyzes the four corners of the sheet and the alignment reference points of the scanned image to detect whether or not there is any position misalignment of the image relative to the sheet. The process then compares, pixel-by-pixel, density values of the reference image and the inspection target scanned image. When, as a result of the comparison, there has not been detected any difference equal to or larger than a predetermined value between the scanned image and the reference image, the inspection result is determined to be OK.

When, on the other hand, a difference equal to or larger than a predetermined value has been detected, the inspection result is determined to be NG, and details of the NG inspection result described in FIG. 5 are recorded in accordance with the type of anomaly. Here, in order to explain a basic inspection operation, a process will be described about a case where an inspection result is always NG when a difference equal to or larger than a predetermined value is detected. The present embodiment then proposes a process for selecting a desired reference image when a difference equal to or larger than a predetermined value is detected. The process will be described below, referring to the flowchart illustrated in FIG. 8.

Next, the processing proceeds to step S707 and the CPU 226 determines whether or not the inspection has been completed within a predetermined time period, and the processing proceeds to step S708 when the inspection has been completed within the predetermined time period, otherwise proceeds to step S709. Unless the inspection is completed and the inspection result is output within a certain time period, a subsequent sheet is scanned by the CISs 315 and 316 of the inspection unit 106 and inspection of the subsequent sheet is started before the completion of inspection of the preceding sheet, and therefore the aforementioned determination is performed in order to meet a timeline.

In addition, when the purge mode is selected in the operation mode setting section 402, the aforementioned determination is performed in order to allow the CPU 221 of the large volume stacker 107 to meet a timeline for switching the conveyance destination so that a sheet whose inspection result is determined, by the inspection apparatus 108, to be NG is discharged to the top tray 320. When the inspection result is NG, the CPU 226 of the inspection apparatus 108 must notify the CPU 221 of the large volume stacker 107 that the inspection result is NG, via the inspection unit I/F 231, the inspection apparatus I/F 215, the accessory I/F 214, and the accessory I/F 220, before the sheet of interest reaches a point at which its conveyance destination can no longer be switched in the large volume stacker 107. Accordingly, upon failing to complete the inspection within a predetermined time period in step S707, the CPU 226 treats the inspection result as an error, and determines that the inspection result of the sheet of interest is equivalent to the NG inspection result.

In step S708, the CPU 226 thus determines the quality of the printed material based on the inspection result of the sheet, and the processing proceeds to step S709 when the inspection result is determined to be NG, or proceeds to step S716 when the inspection result is not NG. In step S709, the CPU 226 reads the operation mode from the RAM 227, and determines whether the operation mode is the purge mode or not. Upon determining that the operation mode is the purge mode, the processing proceeds to step S710, otherwise proceeds to step S715. In step S710, the CPU 226 notifies the CPU 216 of the inspection unit 106 that the inspection result is NG, via the inspection unit I/F 231 and the inspection apparatus I/F 215. Accordingly, the sheet whose inspection resulted in NG is discharged to the top tray 320 of the large volume stacker 107.

Next, the processing proceeds to step S711 and the CPU 226 determines whether or not the recovery mode which has been read from the RAM 227 is a "recovery enabled mode", and the processing proceeds to step S712 when affirmative, otherwise proceeds to step S715. In step S712, the CPU 226 waits until the CPU 226 receives print termination information from the CPU 216 of the inspection unit 106 via the inspection unit I/F 231 and the inspection apparatus I/F 215. Upon receiving the print termination information here, the processing proceeds to step S713. In the print terminated state, the sheet whose inspection result is NG is discharged to the top tray 320 of the large volume stacker 107 altogether with subsequent already-fed sheets remaining in the printing apparatus 101 and the inspection apparatus 108 at the time point when the inspection apparatus 108 determined the inspection result being NG.

In step S713, the CPU 226 reads, from the RAM 227, the reference image corresponding to the sheet whose inspection result is NG, and stores it as a reference image to be inspected next. Next, the processing proceeds to step S714 and the CPU 226 notifies resumption of inspection to the CPU 216 of the inspection unit 106 via the inspection unit I/F 231 and the inspection apparatus I/F 215. The CPU 226 then the processing proceeds to step S715 and the CPU 226 adds information about the sheet whose inspection result is NG to the inspection NG results list 504.

The processing then proceeds to step S716 and the CPU 226 repeats the processing from step S704 to step S715 until inspection of all the sheets has been completed. When inspection of all the sheets has been completed, the processing proceeds to step S717 and, upon accepting an instruction to terminate image reading from the user via the button 502 of the inspection situation screen 501 of FIG. 5 of the display unit 245, the CPU 226 terminates the process.

When the recovery mode read out from the RAM 227 by the CPU 226 in step S711 is "no-recovery mode", the processing proceeds to step S715 and the CPU 226 can terminate subsequent processing similarly to the flow described above. In other words, the printing apparatus 101 discharges only the sheet whose inspection result is NG to the top tray 320, and the printing apparatus 101 and the inspection apparatus 108 continue inspection of subsequent sheets as usual. Additionally, upon determining in step S709 that the operation mode is the log mode, the processing proceeds to step S715, and the printing apparatus 101 discharges the sheets subjected to inspection to a discharge destination preliminarily specified in the print job property regardless of the result of inspection performed by the inspection apparatus 108, whereby the inspection apparatus 108 continues the inspection as usual. When the inspection result is OK in step S708, the processing proceeds to step S716 and the CPU 226 can terminate subsequent processing similarly to the flow described above.

Note that the example presented here is merely illustrative, and the instruction from the user via the display unit 245 to start image reading, for example, may be automatically performed in conjunction with an instruction to start printing at the printing apparatus 101, the information processing apparatus 109, or the client computer 110, and the manner thereof is not limited to any form. In addition, the instruction from the user via the display unit 245 to terminate image reading may also be automatically performed in conjunction with termination of printing at the printing apparatus 101, and the manner thereof is not limited to any form.

Figure 8:
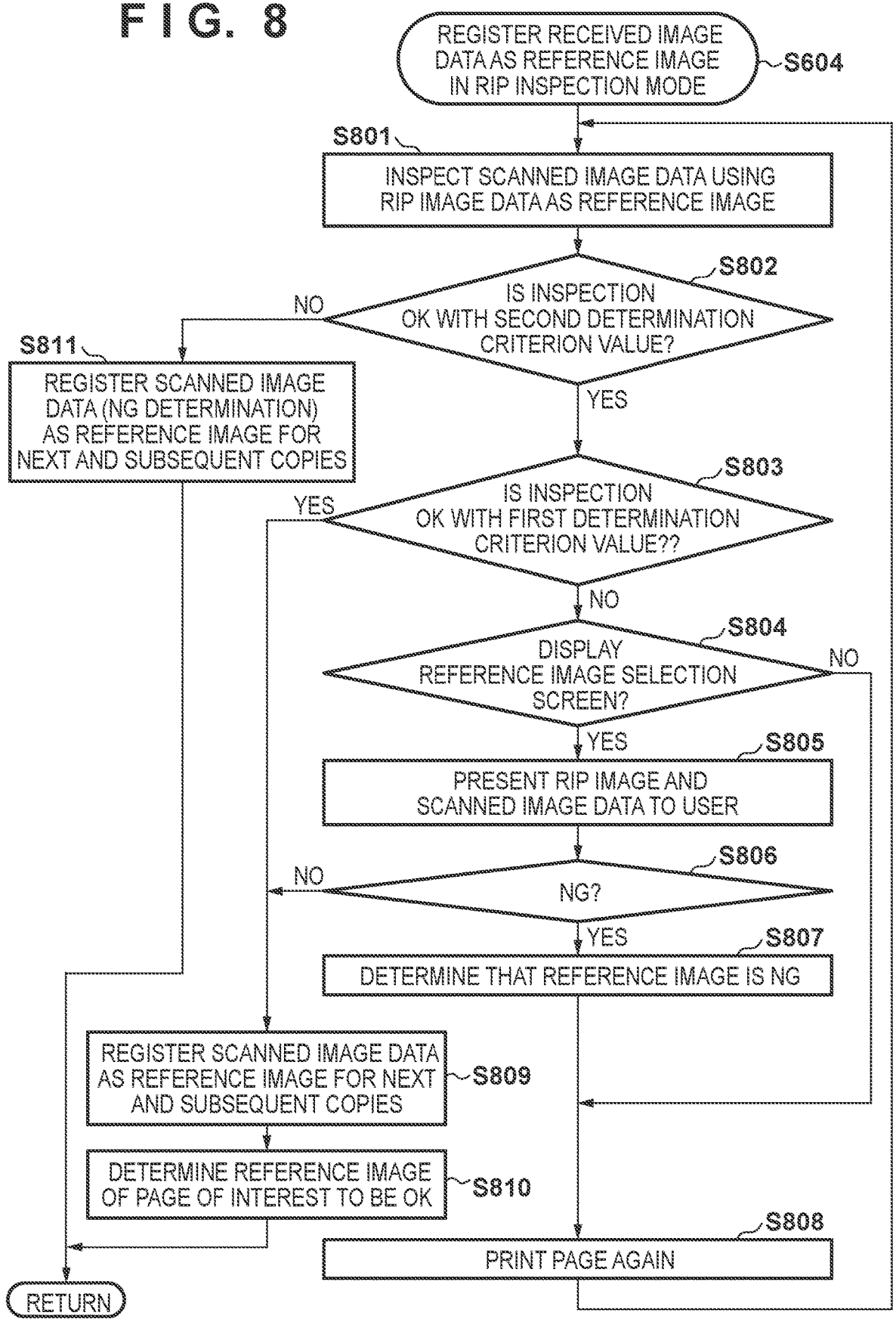
FIG. 8 is a flowchart for describing a reference image data registration process executed, in an RIP inspection mode, by the inspection apparatus according to the embodiment.

FIG. 8 is a flowchart for describing a reference image registration process executed in RIP inspection mode by the inspection apparatus 108 according to an embodiment. The process described in the flowchart is executed in the process of registering the scanned image of the received printed material as a reference image in step S604 of the flowchart illustrated in FIG. 6.

FIG. 9 depicts a view illustrating an example of a reference image selection screen displayed on the display unit 245 of the inspection apparatus 108 according to the embodiment.

In step S801, the CPU 226, being in RIP inspection mode, performs inspection of the scanned image of the printed material using RIP image data as the reference image. Next, the processing proceeds to step S802 and the CPU 226 compares the reference image and the scanned image, and compares the difference therebetween with the determination criterion value set as the second determination criterion value 407 of the inspection criterion setting screen 405 in FIG. 4C. The comparisons are similar to those in step S706 of the basic inspection process described referring to FIG. 7. In step S802, the CPU 226 determines whether the difference is equal to or smaller than (inspection OK) the second determination criterion value 407, and the processing proceeds to step S803 when the inspection is OK with the second determination criterion value 407. To provide an explanation of the foregoing referring to the example in FIG. 4C, the CPU 226 determines in step S802 whether or not the difference is 0.5 mm or smaller, and the processing proceeds to step S803 when the difference is equal to or smaller than 0.5 mm, or proceeds to step S811 when larger than 0.5 mm.

In step S803, the CPU 226 determines whether or not the degree of the difference detected in step S801 is equal to or smaller than (inspection OK) the first determination criterion value set as the first determination criterion value 406 of the inspection criterion setting screen 405. To provide an explanation of the foregoing referring to the example in FIG. 4C, the CPU 226 determines in step S803 whether or not the difference is 0.3 mm or smaller, and the processing proceeds to step S809 when the difference is 0.3 mm or smaller, otherwise, i.e., when larger than 0.3 mm and equal to or smaller than 0.5 mm proceeds to step S804.

Since RIP inspection compares pre-printing RIP image data that is the reference image and a post-printing scanned image, there may occur a negligible difference due to sheet shrinkage or the like. Accordingly, in order to avoid an NG inspection result due to a negligible difference that does not affect the print quality of the product, the CPU 226 determines in steps S802 and S803 whether or not the degree of the detected difference is within the inspection criterion (within a tolerable range).

In the embodiment, the range of inspection criteria is set as the second determination criterion value 407 and the first determination criterion value 406 of the inspection criterion setting screen 405 illustrated in FIG. 4C. When the difference is not within the second determination criterion value 407 (e.g., 0.5) in step S802 (No in step S802), the processing proceeds to step S811 and, determining that the scanned image indicates a value outside the inspection criterion, the CPU 226 registers the scanned image of the page of interest as a reference image for the next and subsequent copies.

When, on the other hand, the difference satisfies the second determination criterion value 407 in step S802 (Yes in step S802), the processing proceeds to step S803 and the CPU 226 determines whether or not the difference satisfies the first determination criterion value 406. When the difference satisfies the first determination criterion value 406 (Yes in step S803), the processing proceeds to step S809. In step S809, the CPU 226 determines that the scanned image satisfies the print quality of the product, and updates and registers the scanned image as a reference image for the next and subsequent copies. The processing then proceeds to step S810 and the CPU 226 records OK in the log of the inspection apparatus 108 as the check result of the reference image, and terminates the process.

When the difference satisfies the second determination criterion value 407 (Yes in step S802) but does not satisfy the first determination criterion value 406 (No in step S803) (as for the example described above 0.3<(difference)≤0.5), the processing proceeds to step S804 and the CPU 226 checks whether or not to display the reference image selection screen, according to the check box 408 of the setting screen 405 in FIG. 4C. When setting is not displaying the reference image selection screen (No in step S804, with check box 408 being not checked), the CPU 226 determines occurrence of a negligible difference that does not affect the print quality of the product, and the processing proceeds to step S808. In step S808, the CPU 226 prints the page again to obtain the scanned image thereof, and repeats comparison of the reference image and the scanned image until inspection of the scanned image becomes OK. The check box 408 in the display screen illustrated in FIG. 4C is a function for ensuring user convenience. The function prevents displaying the reference image selection screen illustrated in FIG. 9 every time on the page of interest in subsequent copies or in re-prints.

When, in contrast, setting is displaying the reference image selection screen in step S804 (Yes in step S804, box 408 being checked), the processing proceeds to step S805 and the CPU 226 presents, on the display unit 245, the reference image selection screen displaying the RIP image data, which is the current reference image, and the scanned image of the printed material, and accepts the determination of the inspection result. Here, details of the reference image selection screen will be described, referring to FIG. 9.

FIG. 9 is a diagram illustrating an example of a reference image selection screen displayed on the inspection apparatus 108 according to the embodiment.

The reference image selection screen 901 is presented to the user in order to accept the user's determination when there is a difference between the reference image and the print result and therefore the inspection result is not necessarily NG, in the case where the inspection method is RIP inspection. In the screen, RIP image 902 that is the current reference image and scanned image 903 that is the print result. As illustrated in FIG. 9, the location where a difference is detected may be rendered comparable and easier to view, using a figure such as a rectangle.

The user compares the images 902 and 903 and, when the print result indicated in the scanned image 903 satisfies the print quality of the product, presses an OK button 904. In such a case, the processing proceeds from step S806 to step S809 in the flowchart illustrated in FIG. 8, and the CPU 226 replaces the reference image with the scanned image of the printed material. This is a case where the user has determined that, although there is a difference between the RIP image data and the scanned image, the scanned image satisfies the print quality of the product. The reason for the foregoing case is that it is desirable to use the scanned image as the reference image when printing subsequent copies or an identical job again at a later time. After having replaced the reference image in step S809, the processing proceeds to step S810 and the CPU 226 determines the reference image of the page of interest to be OK.

An example of such process flow may be a case where the detected difference is associated with the reproducibility of thin lines depending on the performance of the printing apparatus 101, or with a moire image. Upon determining that the detected difference does not impair the print quality of the product, the user sets the inspection result to be OK, and specifies the scanned image of the printed material as the reference image for the next and subsequent copies. The foregoing prevents any similar difference from being detected between the reference images and the scanned images in the next and subsequent inspections. After the reference image of the page is thus determined to be OK in step S810, the processing returns to step S602 illustrated in FIG. 6 and the CPU 226 repeats the process until all the sheets are read.

When the user determined that the print quality of the product is not satisfied, the user presses an NG button 905 on the reference image selection screen 901 illustrated in FIG. 9. In such a case the processing proceeds from step S806 to step S807 and the CPU 226 determines that the reference image of the page is NG. On this occasion, the CPU 226 of the inspection apparatus 108 may store that the reference image is NG in a log to be stored in the storage unit 228. An example of such process flow may be a case where the user determines that the difference of the page of interest does not satisfy the print quality of the product even when the detected difference is associated with the reproducibility of thin lines or with a moire image. In such a case, the user determines the inspection result to be NG, and reviews the print setting and print data or adjusts the printing apparatus 101, as necessary.

Another example is printing failure, in which the type of anomaly is not identified in step S803. That is a case where, for example, neither the condition for determining a circular anomaly nor the condition for determining a streaky anomaly are satisfied, although the detected difference is print smearing. In such a case, the user determines the image to be anomaly and presses the NG button 905. The processing thus proceeds from step S806 to step S807, then proceeds to step S808 with the determination that the reference image is NG, and the CPU 226 prints the page of interest again to obtain the scanned image. In the aforementioned manner, the CPU 226 repeats the flowchart illustrated in FIG. 8 until a reference image satisfying the determination criterion is obtained. As such, descriptions of FIGS. 8 and 9 have been completed.

According to the embodiment as has been described above, there occurs a difference between RIP image data (reference image) and the scanned image due to the performance of the printing apparatus when the inspection method is RIP inspection. However, upon determining that the difference satisfies the print quality of the product, the scanned image of the page of interest is specified as the reference image. Accordingly, it becomes possible to avoid unnecessarily determining the inspection result to be NG, and prevent detecting same differences when printing subsequent copies or an identical job again, whereby productivity of inspection and printing can be improved.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-170469, filed Oct. 18, 2021, which is hereby incorporated by reference herein in its entirety.

What is claimed is:

1. An inspection apparatus comprising:
one or more memories storing instructions; and
one or more processors configured to execute the instructions stored in the one or more memories to:
register, as a reference image, image data generated based on a print job or image data obtained by scanning a printed sheet;
set a determination criterion value used in an inspection of a printed material to determine quality of the printed material;
determine, in an inspection method for inspecting the printed material using the registered reference image which is based on image data generated based on a print job, quality of the printed material based on a difference between scanned image data that is obtained by scanning the print material and the registered reference image and on the determination criterion value; and
control updating of the registered reference image, based on a result of the determination.

2. The inspection apparatus according to claim 1, wherein the determination criterion value includes a first determination criterion value which is a stricter determination criterion, and a second determination criterion value which is a more relaxed determination criterion than the first determination criterion value, and
wherein the registered reference image is updated by replacement with the scanned image data in the updating, when the printed material is determined to be satisfactory in the determination based on a difference between the scanned image data and the registered reference image and on the first determination criterion value.

3. The inspection apparatus according to claim 2, wherein the one or more processors are further configured to execute instructions stored in the one or more memories to:
display a screen that allows for comparing the registered reference image and the scanned image data, in response to the determination that the printed material is satisfactory based on a difference between the scanned image data and the reference image and on the second determination criterion value, and in response to the determination that the printed material is unsatisfactory based on the difference and the first determination criterion value,
wherein the registered reference image is updated by replacement with the scanned image data in the updating, when a difference between the registered reference image and the scanned image data is indicated to be tolerable by using the screen.

4. The inspection apparatus according to claim 3, wherein the one or more processors are further configured to execute instructions stored in the one or more memories to:
allow a user to set whether or not to display the screen, wherein the screen is displayed in the displaying when it is set to display the screen.

5. The inspection apparatus according to claim 2, wherein the one or more processors are further configured to execute instructions stored in the one or more memories to:
register, in the updating, the scanned image data as a reference image for a next and subsequent copies, when the printed material is determined to be unsatisfactory based on a difference between the scanned image data and the registered reference image and on the second determination criterion value.

6. The inspection apparatus according to claim 2, wherein the print job includes an instruction of the inspection method.

7. An inspection system comprising an inspection apparatus and a printing apparatus, the inspection apparatus comprising:
one or more first memories storing instructions; and
one or more first processors configured to execute the instructions stored in the one or more first memories to:
register, as a reference image, image data generated based on a print job or image data obtained by scanning a printed sheet;
set a determination criterion value used in an inspection of a printed material to determine quality of the printed material;
determine, in an inspection method for inspecting a printed material using the registered reference image which is based on image data generated based on the print job, quality of the printed material based on a difference between scanned image data that is obtained by scanning the print material and the registered reference image and on the determination criterion value; and
control updating of the registered reference image, based on a result of the determination, and
the printing apparatus comprising:
one or more second memories storing instructions; and
one or more second processors configured to execute the instructions stored in the one or more second memories to:
generate image data from a received print job and register the generated image data in the inspection apparatus as the reference image; and
convey the printed material printed according to the print job to the inspection apparatus.

8. The inspection system according to claim 7, wherein the one or more first processors are further configured to execute instructions stored in the one or more first memories to:

set such that a printed material determined to be unsatisfactory in the inspection is discharged to a discharge destination that is different from a discharge destination of a printed material determined to be satisfactory in the inspection.

9. The inspection system according to claim 8, wherein the one or more first processors are further configured to execute instructions stored in the one or more first memories to:

set whether or not to execute a recovery processing when the printed material is determined to be unsatisfactory in the inspection, wherein the one or more second processors are further configured to execute instructions stored in the one or more second memories to:

cause, when the recovery processing is set to be executed, the printing apparatus to resume printing from image data intended to be printed on a sheet determined to be unsatisfactory in the inspection, after having discharged the printed material determined to be unsatisfactory in the inspection, altogether with subsequent already-fed sheets remaining in the printing apparatus and the inspection apparatus at a time point when the printed material is determined to be unsatisfactory by the inspection apparatus.

10. The inspection system according to claim 8, wherein the inspection method for inspecting the printed material also includes an inspection method for performing inspection using scanned image data obtained by scanning a printed sheet as a reference image.

11. A method of controlling an inspection apparatus, the method comprising:

registering, as a reference image, image data generated based on a print job or image data obtained by scanning a printed sheet;

setting a determination criterion value used in an inspection of a printed material to determine quality of the printed material;

determining, in an inspection method for inspecting the printed material using the registered reference image which is based on image data generated based on the print job, quality of the printed material based on a difference between scanned image data that is obtained by scanning the print material and the registered reference image and on the determination criterion value; and controlling updating of the registered reference image, based on a result of the determination.

12. A non-transitory computer readable storage medium storing a program for causing a processor to execute a method of controlling an inspection apparatus, the method comprising:

registering, as a reference image, image data generated based on a print job or image data obtained by scanning a printed sheet;

setting a determination criterion value used in an inspection of a printed material to determine quality of the printed material;

determining, in an inspection method for inspecting the printed material using the registered reference image which is based on image data generated based on the print job, quality of the printed material based on a difference between scanned image data that is obtained by scanning the print material and the registered reference image and on the determination criterion value; and controlling updating of the registered reference image, based on a result of the determination.

* * * * *